United States Patent
Wang et al.

(10) Patent No.: US 9,207,478 B2
(45) Date of Patent: Dec. 8, 2015

(54) LIQUID CRYSTAL DISPLAY MODULE AND ARRAY SUBSTRATE

(71) Applicants: BOE TECHNOLOGY GROUP CO., LTD., Beijing (CN); HEFEI BOE OPTOELECTRONICS TECHNOLOGY CO., LTD, Anhui (CN)

(72) Inventors: Hui Wang, Beijing (CN); Xin Ye, Beijing (CN); Feng Qin, Beijing (CN)

(73) Assignees: BOE TECHNOLOGY GROUP CO., LTD., Beijing (CN); HEFEI BOE OPTOELECTRONICS TECHNOLOGY CO., LTD, Anhul (CN)

( * ) Notice: Subject to any disclaimer, the term of this patent is extended or adjusted under 35 U.S.C. 154(b) by 31 days.

(21) Appl. No.: 14/138,758

(22) Filed: Dec. 23, 2013

(65) Prior Publication Data

US 2014/0176853 A1    Jun. 26, 2014

(30) Foreign Application Priority Data

Dec. 24, 2012 (CN) .......................... 2012 1 0567641

(51) Int. Cl.
*G02F 1/1333* (2006.01)
*G02F 1/1335* (2006.01)
*G02F 1/1362* (2006.01)

(52) U.S. Cl.
CPC .... *G02F 1/133308* (2013.01); *G02F 1/133512* (2013.01); *G02F 1/136209* (2013.01); *G02F 1/136286* (2013.01); *G02F 2001/13332* (2013.01); *G02F 2001/133388* (2013.01)

(58) Field of Classification Search
CPC combination set(s) only.
See application file for complete search history.

(56) References Cited

U.S. PATENT DOCUMENTS 5,739,880 A * 4/1998 Suzuki et al. ............... 349/110
2004/0075801 A1* 4/2004 Choi et al. ................... 349/153

(Continued)

FOREIGN PATENT DOCUMENTS

| CN | 1410820 A | 4/2003 |
|---|---|---|
| CN | 101158763 A | 4/2008 |
| CN | 202126558 U | 1/2012 |

(Continued)

OTHER PUBLICATIONS

Extended European Search Report and Search Opinion mailed Mar. 25, 2014 regarding European Application No. 13196110.4.

(Continued)

*Primary Examiner* — Wen-Ying P Chen
(74) *Attorney, Agent, or Firm* — Harness, Dickey & Pierce, P.L.C.

(57) ABSTRACT

The present invention provides a liquid crystal display module comprising: a liquid crystal panel including a color filter substrate and an array substrate that are oppositely arranged to form a cell, a black matrix being arranged at a position close to an edge of the color filter substrate; and a bezel arranged around the liquid crystal panel, wherein a light shielding layer is arranged in a region around the array substrate and close to an edge of the array substrate, and a first angle $\beta_1$ between a line from an outer edge of the light shielding layer to an inner edge of the bezel and a display surface of the liquid crystal panel is less than a second angle $\beta_2$ between a line from an outer edge of the black matrix to the inner edge of the bezel and the display surface of the liquid crystal panel.

11 Claims, 4 Drawing Sheets

(56) References Cited

U.S. PATENT DOCUMENTS

2006/0001823 A1    1/2006    Shih
2006/0012735 A1*   1/2006    Yamada et al. ............... 349/110

FOREIGN PATENT DOCUMENTS

| | | |
|---|---|---|
| CN | 102799018 A | 11/2012 |
| TW | 200602766 | 1/2006 |
| WO | 2011062009 A1 | 5/2011 |

OTHER PUBLICATIONS

Chinese Office Action mailed Nov. 2, 2014 regarding Chinese Application No. 201210567641.6. Translation provided by Dragon Intellectual Property Law Firm.

\* cited by examiner

LIQUID CRYSTAL DISPLAY MODULE AND ARRAY SUBSTRATE

CROSS REFERENCE TO RELATED APPLICATION

This application claims the benefit of CN patent application No. 201210567641.6 filed on Dec. 24, 2012, all of which is incorporated herein by reference.

TECHNICAL FIELD

The present invention relates to the field of liquid crystal display technology, in particular to a liquid crystal display module and an array substrate.

BACKGROUND

Recently, as the intelligence of touch products and mobile products is more and more popular, the image quality of a small-size thin film transistor-liquid crystal display (TFT-LCD) becomes especially important.

FIG. 1 is a sectional view showing a peripheral part of a liquid crystal display module (for clear illustration, the structures that are not associated with the present invention are not shown), which mainly comprises a bezel 100, a color filter glass substrate 201, an array substrate (including TFT) 300, a light-shielding black matrix (BM) 202 on the color filter glass substrate 201, a common electrode 203 (made of Indium Tin Oxide, ITO), a sealant 400 and a backlight unit (BLU) 500. As shown in FIG. 1, an angle α between a line from an outer edge (the edge approaching the bezel) of the black matrix 202 to an inner edge (the edge approaching a liquid crystal panel) of the bezel 100 and a vertical direction (a direction perpendicular to the liquid crystal panel) is a normal visual field of a LCD screen, and within the visual field, an observer can normally see an image on the display screen, without light leakage at the edge of the liquid crystal display module. Opposite to the visual field, at an angle β between a line from the outer edge of the black matrix 202 to the inner edge of the bezel 100 and a horizontal direction (a display surface of the liquid crystal panel), the observer can see the light from a backlight source of the liquid crystal display module, i.e., there is light leakage at the edge of the liquid crystal display module. Currently, when designing a TFT-LCD, the smaller the angle β between the line from the outer edge of the black matrix 202 to the inner edge of the bezel 100 and the display surface of the liquid crystal display module is, the smaller is the probability of the light leakage at the edge of the liquid crystal display module, and the better is the image quality.

Currently, two methods are mainly adopted to improve the light leakage at the edge of the liquid crystal display module. One method includes extending the bezel 100 toward the display region of the liquid crystal panel as possible, so as to cover the display region. However, such a design is against a current trend of a narrow bezel 100. The other method includes extending the black matrix 202 toward the bezel 100, as shown in FIGS. 2 and 3. Referring to FIG. 2, the black matrix 202 extends toward the bezel 100, and the black matrix 202 partially covers the sealant 400. Referring to FIG. 3, the black matrix 202 extends toward the bezel 100, and the black matrix 202 fully covers the sealant 400. However, the black matrix 202 may merely be extended over a limited distance so as not to cover an area greater than that of the color filter glass substrate 201. Especially at the portion of a circuit terminal of the liquid crystal display module (a region where a signal is applied from an external circuit to the LCD screen), the black matrix 202 cannot cover a terminal region of an array glass substrate 301. Meanwhile, when the sealant 400 is designed to be partially or fully covered by the black matrix 202, the reliability of the entire liquid crystal display module will be reduced, because a contact force between the common electrode 203 and the color filter glass substrate 201 is greater than a contact force between the black matrix 202 and the color filter glass substrate 201. When the liquid crystal display module undergoes a high temperature or an impact, the black matrix 202 may fall away from the common electrode 203, and finally the glass substrate may be separated therefrom. As a result, the quality of the liquid crystal display module will be seriously affected.

SUMMARY

An object of the present invention is to provide a liquid crystal display module and an array substrate, so as to reduce the probability of light leakage at an edge of the liquid crystal display module and to improve the image quality of the liquid crystal display module.

In one aspect, an embodiment of the present invention provides a liquid crystal display module comprising:

a liquid crystal panel including a color filter substrate and an array substrate that are oppositely arranged to form a cell, a black matrix being arranged at a position close to an edge of the color filter substrate; and a bezel arranged around the liquid crystal panel, wherein a light shielding layer is arranged in a region around the array substrate and close to an edge of the array substrate, and a first angle β1 between a line from an outer edge of the light shielding layer to an inner edge of the bezel and a display surface of the liquid crystal panel is less than a second angle β2 between a line from an outer edge of the black matrix to the inner edge of the bezel and the display surface of the liquid crystal panel.

Preferably, the black matrix is located at an inner side of the light shielding layer, and the light shielding layer and the black matrix are partially overlapped.

Preferably, a sealant containing a black, light-shielding material is arranged between the color filter substrate and the array substrate and at a position close to an edge of the liquid crystal panel, the black matrix is located at an inner side of the sealant, and the sealant and the black matrix are partially overlapped, and the light shielding layer is located at an outer side of the sealant and the light shielding layer and the sealant are partially overlapped.

Preferably, the light shielding layer is formed by an opaque metallic signal line arranged on the array substrate.

Preferably, the array substrate comprises an array glass substrate, a gate electrode, and a first gate line connected to the gate electrode, the metallic signal line is a second gate line made of the same material as the first gate line, the second gate line entirely covers a region around the array glass substrate and close to an edge of the array glass substrate to form the light shielding layer, and the second gate line is located at a different layer from the first gate line and separated from the first gate line.

Preferably, the array substrate comprises an array glass substrate, a data electrode, and a first data line connected to the data electrode, and the metallic signal line is a second data line made of the same material as the first data line, the second data line entirely covers a region around the array glass substrate and close to the edge of the array glass substrate to form the light shielding layer, the second data line is located at a different layer from the first data line and separated from the first data line.

Preferably, the array substrate comprises an array glass substrate, a gate electrode, a first gate line connected to the gate electrode, a data electrode, and a first data line connected to the data electrode, the metallic signal line includes a second gate line made of the same material as the first gate line and a second data line made of the same material as the first data line, the second gate line is located at the same layer as the first gate line and covers a region where the first gate line is not arranged around an edge of the array glass substrate, and the second gate line is separated from the first gate line, and the second data line is located at the same layer as the first data line, and covers a region around an edge of the array glass substrate and corresponding to the first gate line, and the second data line is separated from the first data line, a projection of the second gate line and a projection of the second data line cover a region around the array glass substrate and close to an edge of the array glass substrate to form the light shielding layer.

Preferably, the array substrate comprises an array glass substrate, a gate electrode, a first gate line connected to the gate electrode, a data electrode, and a first data line connected to the data electrode;

the metallic signal line includes a second gate line made of the same material as the first gate line, and a second data line made of the same material as the first data line, the second data line is located at the same layer as the first data line, and covers a region where the first data line is not arranged around an edge of the array glass substrate, and the second data line is separated from the first data line, and the gate line is located at the same layer as the first gate line, and covers a region around an edge of the array glass substrate and corresponding to the first data line, and the second gate line is separated from the first gate line a projection of the second gate line and a projection of the second data line cover a region around the array glass substrate and close to an edge of the array glass substrate to form the light shielding layer.

Preferably, the first gate line, the second gate line, the first data line and the second data line are separated from each other through insulating layers.

Preferably, a distance between an outer edge of the light shielding layer and an outer edge of the array glass substrate of the array substrate is larger than or equal to 0.2 mm.

An embodiment of the present invention further provides an array substrate, used for a liquid crystal display module, wherein the liquid crystal display module comprises a liquid crystal panel including a color filter substrate and an array substrate that are oppositely arranged to form a cell, a black matrix being arranged at a position close to an edge of the color filter substrate; and a bezel arranged around the liquid crystal panel, wherein a light shielding layer is arranged around the array substrate and close to an edge of the array substrate, and a first angle β1 between a line from an outer edge of the light shielding layer to an inner edge of the bezel and a display surface of the liquid crystal panel is less than a second angle β2 between a line from an outer edge of the black matrix to the inner edge of the bezel and the display surface of the liquid crystal panel.

An embodiment of the present invention has the following advantageous effect.

According to an embodiment of the present invention, the light shielding layer is arranged on the array substrate to block out the light from a backlight source, thereby to reduce the probability of light leakage at the edge of the liquid crystal display module and to improve the image quality of the liquid crystal display module.

According to a preferred embodiment of the present invention, the light shielding layer is formed by metallic signal lines which are arranged at the edges of the array glass substrate and cooperate with the sealant and the black matrix including the black, light-shielding material, so as to reduce the probability of light leakage at the edge of the liquid crystal display module and improve the image quality of the liquid crystal display module in the case that the production cost is not increased and the reliability of the product is ensured.

DETAILED DESCRIPTION

To make the objects, the technical solutions and the advantages of the present invention more apparent, the present invention is described hereinafter in conjunction with the drawings as well as the embodiments. It should be appreciated that, the embodiments mentioned hereinafter are merely for illustrative purpose, but cannot be construed as limiting the present invention.

Figure 1:
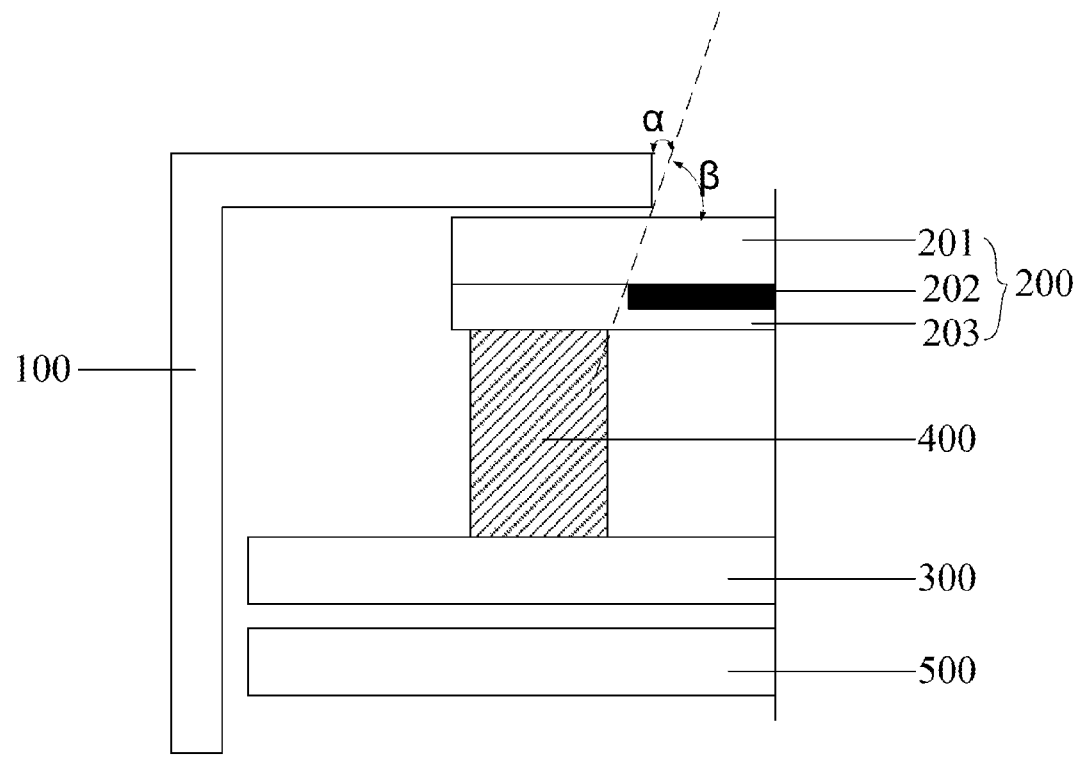
FIG. 1 is a schematic structure diagram showing a peripheral part of an existing liquid crystal display module.
Figure 2:
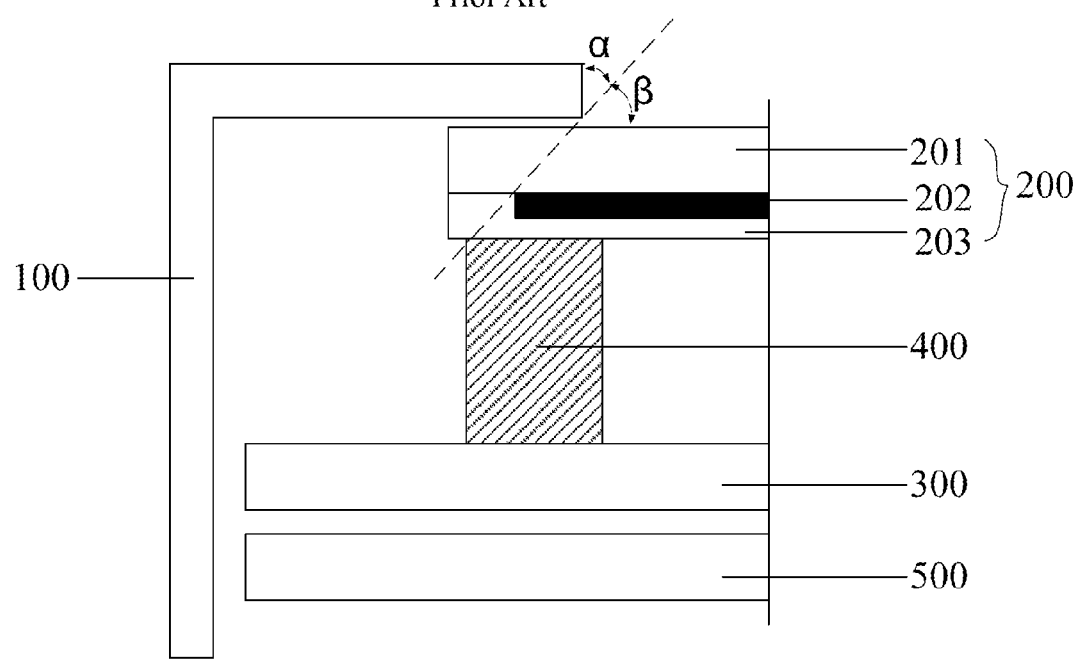
FIG. 2 is a schematic structure diagram showing a peripheral part of an existing liquid crystal display module where a black matrix extends toward a bezel and partially covers a sealant.
Figure 3:
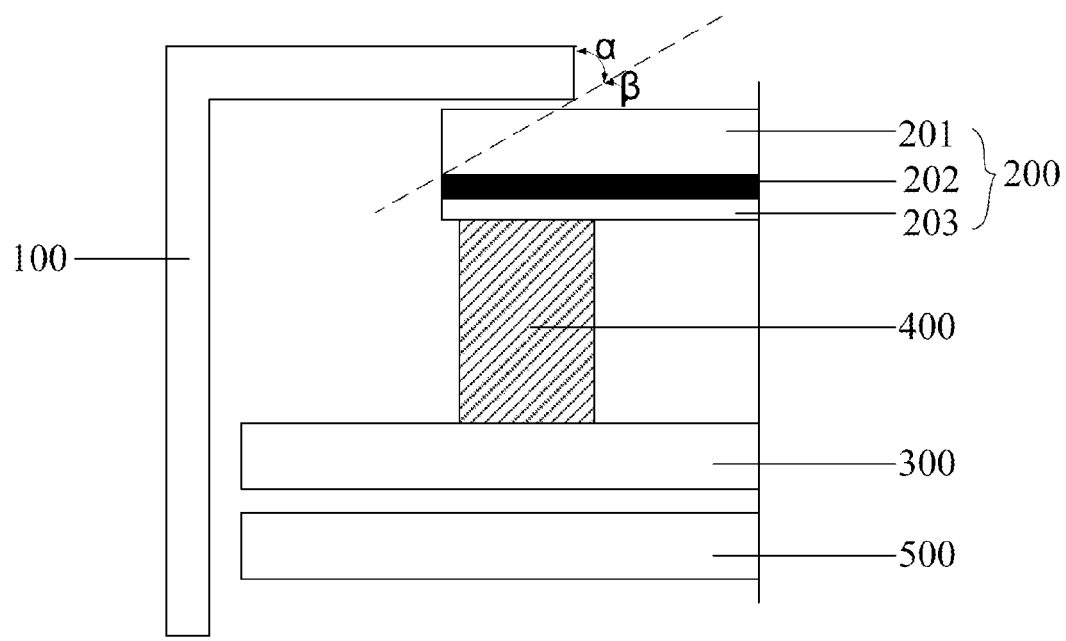
FIG. 3 is a schematic structure diagram showing a peripheral part of an existing liquid crystal display module where the black matrix extends toward a bezel and fully covers the sealant.
Figure 4:
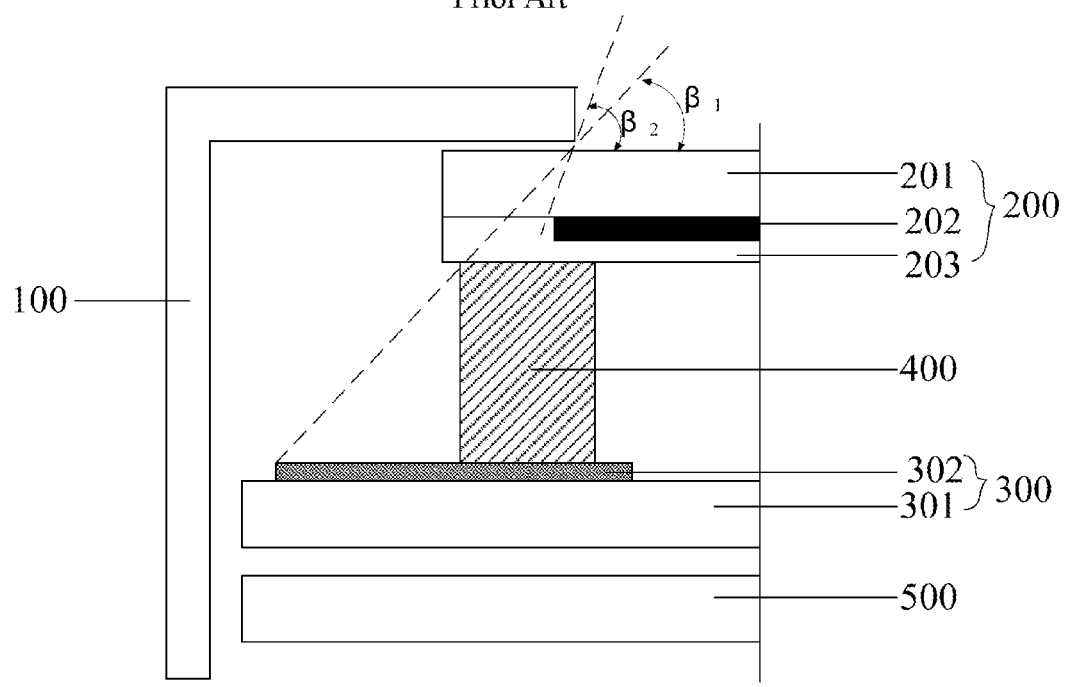
FIG. 4 is a schematic structure diagram showing a peripheral part of a liquid crystal display module according to an embodiment of the present invention.

FIG. 4 is a schematic structure diagram showing a liquid crystal display module according to an embodiment of the present invention. As shown in FIG. 4, the liquid crystal display module comprises a liquid crystal panel and a bezel 100 arranged around the liquid crystal panel. The liquid crystal panel comprises a color filter substrate 200 and an array substrate 300 which are oppositely arranged to form a cell. The array substrate 300 includes an array glass substrate 301 (for clear illustration, the structures that form the array substrate 300 but are not associated with the present invention are not shown). The color filter substrate 200 includes a color filter glass substrate 201, a black matrix 202 arranged at a position close to an edge of the color filter glass substrate 201, and a common electrode 203 covering the black matrix 202

(for clear illustration, the structures that form the color filter substrate 200 but are not associated with the present invention are not shown).

A light shielding layer 302 is arranged in a region around the array substrate 300 and close to an edge of the array substrate.

A first angle $\beta_1$ is formed between a line from an outer edge of the light shielding layer 302 to an inner edge of the bezel 100 and a display surface of the liquid crystal panel.

A second angle $\beta_2$ is formed between a line from an outer edge of the black matrix 202 to the inner edge of the bezel 100 and the display surface of the liquid crystal panel, and the first angle $\beta_1$ is less than the second angle $\beta_2$.

Since the smaller the angle between the line from the outer edge of the black matrix 202 to the inner edge of the bezel 100 and a horizontal direction is, the smaller is the region where an observer may see the light from a backlight source at an edge of the liquid crystal display module (i.e., the less is the light that can cause light leakage), and the smaller is the probability of the light leakage at the edge of the liquid crystal display module, and the better is the image quality. However, in the prior art, there are many problems when the black matrix 202 extends toward the edge of the array substrate.

Hence, in an embodiment of the present invention, the light shielding layer 302 is arranged at a position close to the edge of the array substrate 300 to block out the light from the backlight source, and the first angle $\beta_1$ between the line from the outer edge of the light shielding layer 302 to the inner edge of the bezel 100 and the display surface of the liquid crystal panel is less than the second angle $\beta_2$ between the line from the outer edge of the black matrix 202 to the inner edge of the bezel 100 and the display surface of the liquid crystal panel. Therefore, the arrangement of the light shielding layer 302 provide a smaller region where the observer can see the light from the backlight source of the liquid crystal display module, thereby to reduce the probability of the light leakage at the edge of the liquid crystal display module and improve the image quality.

In order to block out the light from the backlight source in a better manner, preferably, a sealant 400 containing a black, light-shielding material is arranged between the color filter substrate 200 and the array substrate 300 and at a position close to an edge of the liquid crystal panel.

The black matrix 202 is located at an inner side of the sealant 400, and an inner side portion of the sealant 400 partially overlaps an outer side portion of the black matrix 202.

The light shielding layer 302 is located at an outer side of the sealant 400, and an inner side portion of the light shielding layer 302 partially overlaps an outer side portion of the sealant 400.

Since the black, light-shielding material contained in the sealant 400 has an optical density greater than 3, it can meet the light-shielding requirement of the liquid crystal display module. As a result, the sealant 400 containing the black, light-shielding material can cooperate with the black matrix 202 and the light shielding layer 302, so as to block out the light from the backlight source and reduce the probability of the light leakage at the edge of the liquid crystal display module.

It should be noted that, the black, light-shielding material contained in the sealant 400 may be a black, epoxy resin. For example, the sealant containing a black, light-shielding material as mentioned in the Chinese patent application No. 201010158945.8 may be used, all of which is incorporated herein by reference. Further explanation will not be made to the sealant 400 herein.

In addition, in order to black out the light in a better manner, preferably, as shown in FIG. 4, the inner side portion of the light shielding layer 302 may overlap the outer side portion of the black matrix 202.

It should be appreciated that, a common sealant through which the light can pass may also be adopted in a practical application. At this time, in order to block out the light in a better manner, the light shielding layer 302 is arranged at the outer side of the black matrix 202, and a projection of the inner side of the light shielding layer 302 onto the display surface of the liquid crystal panel partially overlaps a projection of the outer side of the black matrix 202 onto the display surface of the liquid crystal panel. As a result, it can prevent the light leakage phenomenon when the light from the backlight source passes through a gap between the inner side of the light shielding layer 302 and the outer side of the black matrix 202 by the light shielding layer 302 partially overlapping the black matrix 202.

In addition, in the prior art, the array substrate 300 is provided with a circuit terminal region (a region where a signal is applied by an external circuit to the LCD screen), in which the metallic signal lines for transmitting signals are distributed. These metallic signal lines include a plurality of gate lines connected to the gate electrode and a plurality of data lines connected to the data electrode. Since there is wiring in the circuit terminal region, and the black matrix 202 cannot extend on the color filter substrate 200 to cover the entire array glass substrate of the array substrate 300, in the liquid crystal display module according to an embodiment of the present invention, the light shielding layer 302 is preferably formed by opaque metallic signal lines on the array substrate 300, and the metallic signal lines forming the light shielding layer 302 are disconnected from the metallic signal lines distributed over the circuit terminal region for transmitting signals. Hence, the normal signal transmission on the array glass substrate will not be affected.

To be specific, several methods of forming the metallic signal lines are described in the following preferred embodiments.

In these embodiments, the light shielding layer 302 may be formed by a gate line made of the same material as the gate line for transmitting signals and/or a data line made of the same material as the data line for transmitting signals. To facilitate the description, the gate line for transmitting signals is referred to as a first gate line, the gate line for forming the light shielding layer is referred to as a second gate line, the data line for transmitting signals is referred to as a first data line, and the data line for forming the light shielding layer is referred to as a second data line.

First Embodiment

Figure 5:
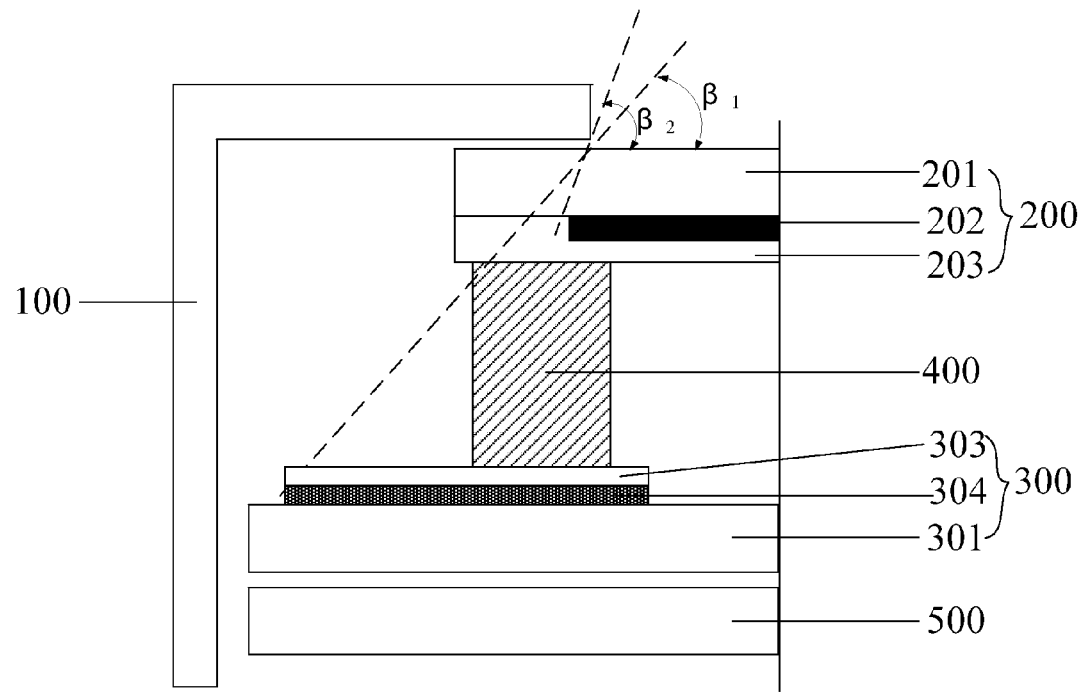
FIG. 5 is a schematic structure diagram showing a peripheral part of the liquid crystal display module according to an embodiment of the present invention, where a light shielding layer is formed by gate lines.

FIG. 5 is a schematic structure diagram showing a peripheral part of the liquid crystal display module according to the first embodiment of the present invention. In FIG. 5, merely the array glass substrate 301 forming the array substrate 300 and the metallic signal lines forming the light shielding layer 302 are shown, and other layers forming the array substrate 300 are not shown.

Referring to FIG. 5, in this embodiment, the liquid crystal display module comprises a liquid crystal panel and a bezel 100 arranged around the liquid crystal panel. The liquid crystal panel includes a color filter substrate 200 and an array substrate 300 that are oppositely arranged to form a cell. The color filter substrate 200 includes a color filter glass substrate 201, a black matrix 202 arranged at a position close to an edge of the color filter glass substrate 201, and a common electrode covering the black matrix 202 (other components for forming the color filter substrate 200 are not shown).

The array substrate 300 includes an array glass substrate 301, and the metallic signal lines for transmitting signals (not shown) are distributed over a circuit terminal region of the array glass substrate 301. These metallic signal lines include a gate electrode, a first gate line for transmitting signals connected to the gate electrode, a data electrode, and a first data line for transmitting signals connected to the data electrode.

A second gate line 304 is provided in a region around the array glass substrate and close to the edges of the array glass substrate 301 so as to form the light shielding layer 302. The second gate line 304 is located at a different layer from the first gate line, and the first gate line and the second gate line 304 are separated from each other through an insulating layer 303.

In this embodiment, the light shielding layer 302 may be formed by merely covering the region around the array glass substrate and close to the edges of the array glass substrate 301 with a layer of gate line, i.e., by merely adding a mask onto the array glass substrate 301 to form the second gate line 304, so the process is simple. Moreover, the second gate line 304 for forming the light shielding layer 302 is separated from the first gate line for transmitting signals through the insulating layer 303, so that the normal signal transmission of the first gate line will not be affected.

Second Embodiment

Figure 6:
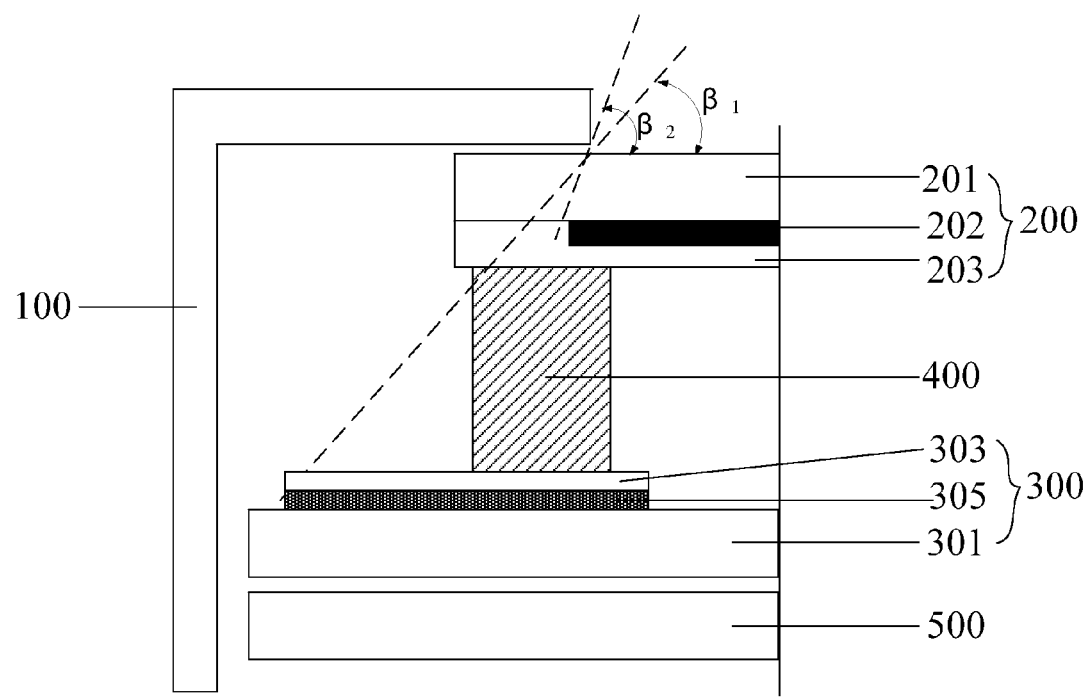
FIG. 6 is a schematic structure diagram showing a peripheral part of the liquid crystal display module according to an embodiment of the present invention, where the shielding line is formed by data lines.

FIG. 6 is a schematic structure diagram showing a peripheral part of the liquid crystal display module according to the second embodiment of the present invention. In FIG. 6, merely the array glass substrate 301 for forming the array substrate 300 and the metallic signal lines for forming the light shielding layer are shown, and other layers for forming the array substrate 300 are not shown.

Referring to FIG. 6, in this embodiment, the liquid crystal display module comprises a liquid crystal panel, and a bezel 100 arranged around the liquid crystal panel. The liquid crystal panel includes a color filter substrate 200 and an array substrate 300 that are oppositely arranged to form a cell. The color filter substrate 200 includes a color filter glass substrate 201, a black matrix 202 arranged at a position close to an edge of the color filter glass substrate 201, and a common electrode 203 covering the black matrix 202 (other components for forming the color filter substrate 200 are not shown).

The array substrate 300 includes an array glass substrate 301, and the metallic signal lines for transmitting signals (not shown) are distributed over a circuit terminal region of the array glass substrate 301. These metallic signal lines include a gate electrode, a first gate line for transmitting signals connected to the gate electrode, a data electrode, and a first data line for transmitting signals connected to the data electrode.

A second data line 305 is provided in a region around the array glass substrate and close to the edges of the array glass substrate 301 so as to form the light shielding layer 302. The second data line 305 is located at a different layer from the first data line, and the first data line and the second data line 305 are separated from each other through an insulating layer 303.

In this embodiment, the light shielding layer 302 may be formed by merely covering the region around the array glass substrate and close to the edges of the array glass substrate 301 with a layer of data line, i.e., by merely adding a mask onto the array glass substrate 301 to form the second data line 305, so the process is simple. Moreover, the second data line 305 for forming the light shielding layer 302 is separated from the first data line for transmitting signals through the insulating layer 303, so that the normal signal transmission of the first data line will not be affected.

Third Embodiment

In this embodiment, the light shielding layer of the liquid crystal display module is formed by both the second gate line 304 and the second data line 305.

Figure 7:
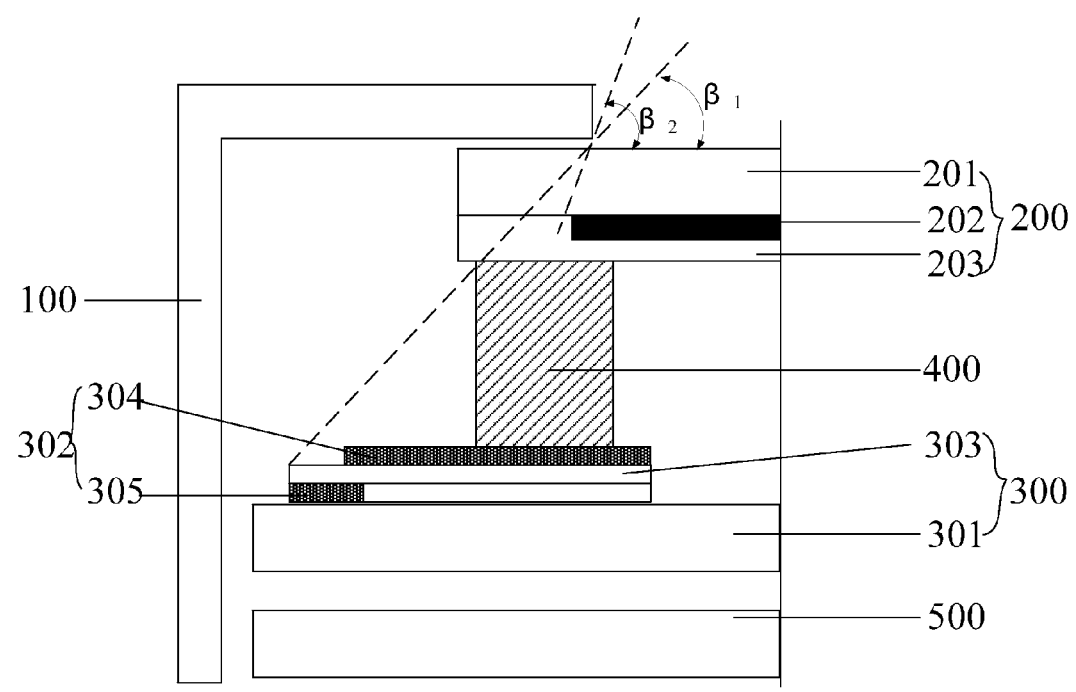
FIG. 7 is a schematic structure diagram showing a peripheral part of the liquid crystal display module according to an embodiment of the present invention, where the light shielding layer is formed by gate lines and data lines.

FIG. 7 is a schematic structure diagram showing a peripheral part of the liquid crystal display module according to the third embodiment of the present invention. In FIG. 7, merely the array glass substrate 301 for forming the array substrate 300 and the metallic signal lines for forming the light shielding layer are shown, and other layers for forming the array substrate 300 are not shown.

Referring to FIG. 7, the liquid crystal display module comprises a liquid crystal panel, and a bezel 100 arranged around the liquid crystal panel. The liquid crystal panel includes a color filter substrate 200 and an array substrate 300 that are oppositely arranged to form a cell. The color filter substrate 200 includes a color filter glass substrate 201, a black matrix 202 arranged at a position close to an edge of the color filter glass substrate 201, and a common electrode 203 for covering the black matrix 202 (other components for forming the color filter substrate 200 are not shown).

The array substrate 300 includes an array glass substrate 301, and the metallic signal lines for transmitting signals (not shown) are distributed over a circuit terminal region of the array glass substrate 301. These metallic signal lines include a gate electrode, a first gate line for transmitting signals connected to the gate electrode, a data electrode, and a first data line for transmitting signals connected to the data electrode.

A second gate line 304 is provided in a region around the array glass substrate and close to the edges of the array glass substrate 301. The second gate line 304 is located at the same layer as the first gate line, and covers a region where the first gate line is not arranged around the edge of the array glass substrate 301. The first gate line and the second gate line 305 are separated from each other through an insulating layer 303.

A second data line 305 is provided in a region around the array glass substrate and close to the edges of the array glass substrate 301. The second data line 305 is located at the same layer as the first data line, and covers a region around the edges of the array glass substrate and corresponding to the first gate line. The first data line and the second data line are separated from each other through an insulating layer 303.

A projection of the second gate line and a projection of the second data line cover the region around the array glass substrate and close to the edges of the array glass substrate 301 so as to form the light shielding layer.

The first data line and the second data line 305 are located at a different layer from the first gate line and the second gate line 304, and separated therefrom through the insulating layer 303.

In this embodiment, the light shielding layer 302 is formed by the two kinds of metallic signal lines on the array substrate 300. The second gate line 304 for blocking out the light is located at the same layer as the first gate line on the array glass substrate 301, and these gate lines may be formed by the same mask, so the production cost will not be increased. Similarly, the second data line 305 for blocking out the light is located at the same layer as the first data line on the array glass substrate 301, and these data lines may be formed by the same mask, so the production cost will not be increased.

In addition, the second data line 305 for forming the light shielding layer 302 is separated from the first data line for transmitting signals by the insulating layer 303, and the second gird line 304 for forming the light shielding layer 302 is separated from the first gate line for transmitting signals by the insulating layer 303, so the normal signal transmission of the first gate line and the first data line will not be affected.

Fourth Embodiment

In this embodiment, the light shielding layer of the liquid crystal display module is formed by both the second gate line 304 and the second data line 305.

Referring again to FIG. 7, in this embodiment, the liquid crystal display module comprises a liquid crystal panel, and a bezel 100 arranged around the liquid crystal panel. The liquid crystal panel includes a color filter substrate 200 and an array substrate 300 that are oppositely arranged to form a cell. The color filter substrate 200 includes a color filter glass substrate 201, a black matrix 202 arranged at a position close to an edge of the color filter glass substrate 201, and a common electrode 203 covering the black matrix 202 (other components for forming the color filter substrate 200 are not shown).

The array substrate 300 includes an array glass substrate 301, and the metallic signal lines for transmitting signals (not shown) are distributed over a circuit terminal region of the array glass substrate 301. These metallic signal lines include a gate electrode, a first gate line for transmitting signals connected to the gate electrode, a data electrode, and a first data line for transmitting signals connected to the data electrode.

A second data line 305 is provided in a region around the array glass substrate and close to the edges of the array glass substrate 301. The second data line 305 is located at the same layer as the first data line, and covers a region where the first data line is not arranged around the edge of the array glass substrate 301. The first data line and the second data line 305 are separated from each other.

A second gate line 304 is provided at a position close to an edge of the array glass substrate 301. The second gate line 304 is located at the same layer as the first gate line, and covers a region around the edges of the array glass substrate and corresponding to the first data line. The second gate line 304 and the first gate line are separated from each other.

A projection of the second gate line and a projection of the second data line cover the region around the array glass substrate and close to the edges of the array glass substrate 301 so as to form the light shielding layer.

The first data line and the second data line 305 are located at a different layer from the first gate line and the second gate line 304, and separated therefrom through the insulating layer 303.

In this embodiment, the light shielding layer 302 is formed by the two kinds of metallic signal lines on the array substrate 300. The second gate line 304 for blocking out the light is located at the same layer as the first gate line on the array glass substrate 301, and these gate lines may be formed by the same mask, so the production cost will not be increased. Similarly, the second data line 305 for blocking out the light is located at the same layer as the first data line on the array glass substrate 301, and these data lines may be formed by the same mask, so the production cost will not be increased.

In addition, the second data line 305 for forming the light shielding layer 302 is separated from the first data line for transmitting signals by the insulating layer 303, and the second gird line 304 for forming the light shielding layer 302 is separated from the first gate line for transmitting signals by the insulating layer 303, so that the normal signal transmission of the first gate line and the first data line will not be affected.

The above are merely the preferred embodiments of the present invention. It should be appreciated that, in actual application, the methods of forming the light shielding layer 302 with the metallic signal lines are not limited to the above, and the other methods may also be used.

For example, the light shielding layer is formed by the second gate line 304 and the second data line 305, but the second gate line 304 is located at a layer different from the first gate line, or the second data line 305 is located at a layer different from the first data line. Alternatively, the coverage of the first gate line and the second gate line 304 may be adjusted appropriately, or the coverage of the first data line and the second data line 305 may be adjusted appropriately.

In addition, in order to ensure the quality of a cutting process for the liquid crystal display module, a distance between the metallic signal line for forming the light shielding layer 302 and the outer edge of the array glass substrate 301 is usually greater than the cutting accuracy. For example, for the array glass substrate 301 with the $6^{th}$ generation lines, its cutting accuracy is 0.2 mm, so the distance between the outer edge of the light shielding layer 302 and the outer edge of the array glass substrate 301 of the array substrate 300 shall be greater than or equal to 0.2 mm.

The above are merely the preferred embodiment of the present invention, but shall not be construed as limiting the present invention. Any modification, equivalents and improvements made without departing from the spirit and principle of the present application shall be included in the scope of the present invention.

What is claimed is:
1. A liquid crystal display module, comprising:
a liquid crystal panel including a color filter substrate and an array substrate that are oppositely arranged to form a cell, the color filter substrate including a black matrix arranged at a position close to an edge of the color filter substrate; and
a bezel arranged around the liquid crystal panel, wherein
a light shielding layer is arranged in a region around the array substrate and close to an edge of the array substrate,
a first angle $\beta 1$ between a line from an outer edge of the light shielding layer to an inner edge of the bezel and a display surface of the liquid crystal panel is less than a second angle $\beta 2$ between a line from an outer edge of the black matrix to the inner edge of the bezel and the display surface of the liquid crystal panel,
the light shielding layer is formed by a metallic signal line arranged on the array substrate,
the metallic signal line is opaque,
the array substrate comprises an array glass substrate, a gate electrode, a first gate line connected to the gate electrode, a data electrode, and a first data line connected to the data electrode, and
at least one of
(i) the metallic signal line is a second gate line made of the same material as the first gate line, the second gate line entirely covers a region around the array glass substrate and close to an edge of the array glass substrate to form the light shielding layer, and the second gate line is located at a different layer from the first gate line and separated from the first gate line, or

(ii) the metallic signal line is a second data line made of the same material as the first data line, the second data line entirely covers a region around the array glass substrate and close to an edge of the array glass substrate to form the light shielding layer, and the second data line is located at a different layer from the first data line and separated from the first data line.

2. The liquid crystal display module according to claim 1, wherein the black matrix is located at an inner side of the light shielding layer, and the light shielding layer and the black matrix are partially overlapped.

3. The liquid crystal display module according to claim 1, wherein a sealant containing a black, light-shielding material is arranged between the color filter substrate and the array substrate and at a position close to an edge of the liquid crystal panel, the black matrix is located at an inner side of the sealant, and the sealant and the black matrix are partially overlapped, and the light shielding layer is located at an outer side of the sealant and the light shielding layer and the sealant are partially overlapped.

4. The liquid crystal display module according to claim 1, wherein a distance between an outer edge of the light shielding layer and an outer edge of the array glass substrate of the array substrate is greater than or equal to 0.2 mm.

5. The liquid crystal display module according to claim 1, wherein the first gate line, the first data line, and the one of the second gate line or the second data line are separated from each other through insulating layers.

6. A liquid crystal display module, comprising:

a liquid crystal panel including a color filter substrate and an array substrate that are oppositely arranged to form a cell, the color filter substrate including a black matrix arranged at a position close to an edge of the color filter substrate; and a bezel arranged around the liquid crystal panel, wherein a light shielding layer is arranged in a region around the array substrate and close to an edge of the array substrate, a first angle $\beta 1$ between a line from an outer edge of the light shielding layer to an inner edge of the bezel and a display surface of the liquid crystal panel is less than a second angle $\beta 2$ between a line from an outer edge of the black matrix to the inner edge of the bezel and the display surface of the liquid crystal panel, the light shielding layer is formed by a metallic signal line arranged on the array substrate, the metallic signal line is opaque, the array substrate comprises an array glass substrate, a gate electrode, a first gate line connected to the gate electrode, a data electrode, and a first data line connected to the data electrode, the metallic signal line includes a second gate line made of the same material as the first gate line and a second data line made of the same material as the first data line, the second gate line is located at the same layer as the first gate line and covers a region where the first gate line is not arranged around an edge of the array glass substrate, and the second gate line is separated from the first gate line, the second data line is located at the same layer as the first data line, and covers a region around an edge of the array glass substrate and corresponding to the first gate line, and the second data line is separated from the first data line, and a projection of the second gate line and a projection of the second data line cover a region around the array glass substrate and close to an edge of the array glass substrate to form the light shielding layer.

7. The liquid crystal display module according to claim 6, wherein the first gate line, the second gate line, the first data line and the second data line are separated from each other through insulating layers.

8. The liquid crystal display module according to claim 6, wherein a distance between an outer edge of the light shielding layer and an outer edge of the array glass substrate of the array substrate is greater than or equal to 0.2 mm.

9. A liquid crystal display module, comprising:

a liquid crystal panel including a color filter substrate and an array substrate that are oppositely arranged to form a cell, the color filter substrate including a black matrix arranged at a position close to an edge of the color filter substrate; and a bezel arranged around the liquid crystal panel, wherein a light shielding layer is arranged in a region around the array substrate and close to an edge of the array substrate, a first angle $\beta 1$ between a line from an outer edge of the light shielding layer to an inner edge of the bezel and a display surface of the liquid crystal panel is less than a second angle $\beta 2$ between a line from an outer edge of the black matrix to the inner edge of the bezel and the display surface of the liquid crystal panel, the light shielding layer is formed by a metallic signal line arranged on the array substrate, the metallic signal line is opaque, the array substrate comprises an array glass substrate, a gate electrode, a first gate line connected to the gate electrode, a data electrode, and a first data line connected to the data electrode, the metallic signal line includes a second gate line made of the same material as the first gate line and a second data line made of the same material as the first data line, the second data line is located at the same layer as the first data line, and covers a region where the first data line is not arranged around an edge of the array glass substrate, the second data line is separated from the first data line, the gate line is located at the same layer as the first gate line, and covers a region around an edge of the array glass substrate and corresponding to the first data line, the second gate line is separated from the first gate line, and a projection of the second gate line and a projection of the second data line cover a region around the array glass substrate and close to an edge of the array glass substrate to form the light shielding layer.

10. The liquid crystal display module according to claim 9, wherein the first gate line, the second gate line, the first data line and the second data line are separated from each other through insulating layers.

11. The liquid crystal display module according to claim 9, wherein a distance between an outer edge of the light shielding layer and an outer edge of the array glass substrate of the array substrate is greater than or equal to 0.2 mm.

* * * * *